May 19, 1953  H. C. EDWARDS  2,638,723
MECHANISM FOR FEEDING CYLINDRICAL ARTICLES
INTO A CENTERLESS GRINDER
Filed Jan. 21, 1950  2 Sheets-Sheet 1

INVENTOR:
Herbert C. Edwards,
By Carr & Carr & Gravely,
HIS ATTORNEYS.

May 19, 1953

H. C. EDWARDS 2,638,723

MECHANISM FOR FEEDING CYLINDRICAL ARTICLES INTO A CENTERLESS GRINDER

Filed Jan. 21, 1950

INVENTOR:
Herbert C. Edwards,
By Cans Cans Gravely,
HIS ATTORNEYS.

Patented May 19, 1953

2,638,723

UNITED STATES PATENT OFFICE 2,638,723

MECHANISM FOR FEEDING CYLINDRICAL ARTICLES INTO A CENTERLESS GRINDER

Herbert C. Edwards, Canal Fulton, Ohio, assignor to The Timken Roller Bearing Company, Canton, Ohio, a corporation of Ohio Application January 21, 1950, Serial No. 139,951

8 Claims. (Cl. 51—215)

This invention relates to article feeding mechanism and is more particularly directed to a device for automatically and continuously feeding cylindrical articles into a machine tool.

The principal object of the invention is to provide mechanism for feeding cylindrical articles, having a relatively short length, into a machine tool without violent or irregular motion.

A further object of the invention is to provide a continuously operating feeding mechanism that is simple in construction, unfailing in performance, and will function indefinitely without manual attention for feeding relatively short cylindrical work pieces to a machine tool.

The invention consists in the provision of mechanism for feeding cylindrical work pieces into a spring supported feed track terminating at the throat of a centerless grinding machine in which a vibrator is connected to the feed track for advancing cylindrical work pieces whose diameters are greater than their lengths and which provides mechanism for arranging the work pieces in peripheral contact in a chute. The invention also consists in the provision of mechanism for receiving the work pieces from the chute and delivering them in end-to-end relation on the track for presentation to the centerless grinding machine, and which provides an adjustable lever means for supporting the major portion of the weight of the work pieces and those in the chute so that when the work piece on the track passes from under the supported work piece the latter will drop onto the track.

Figure 1:
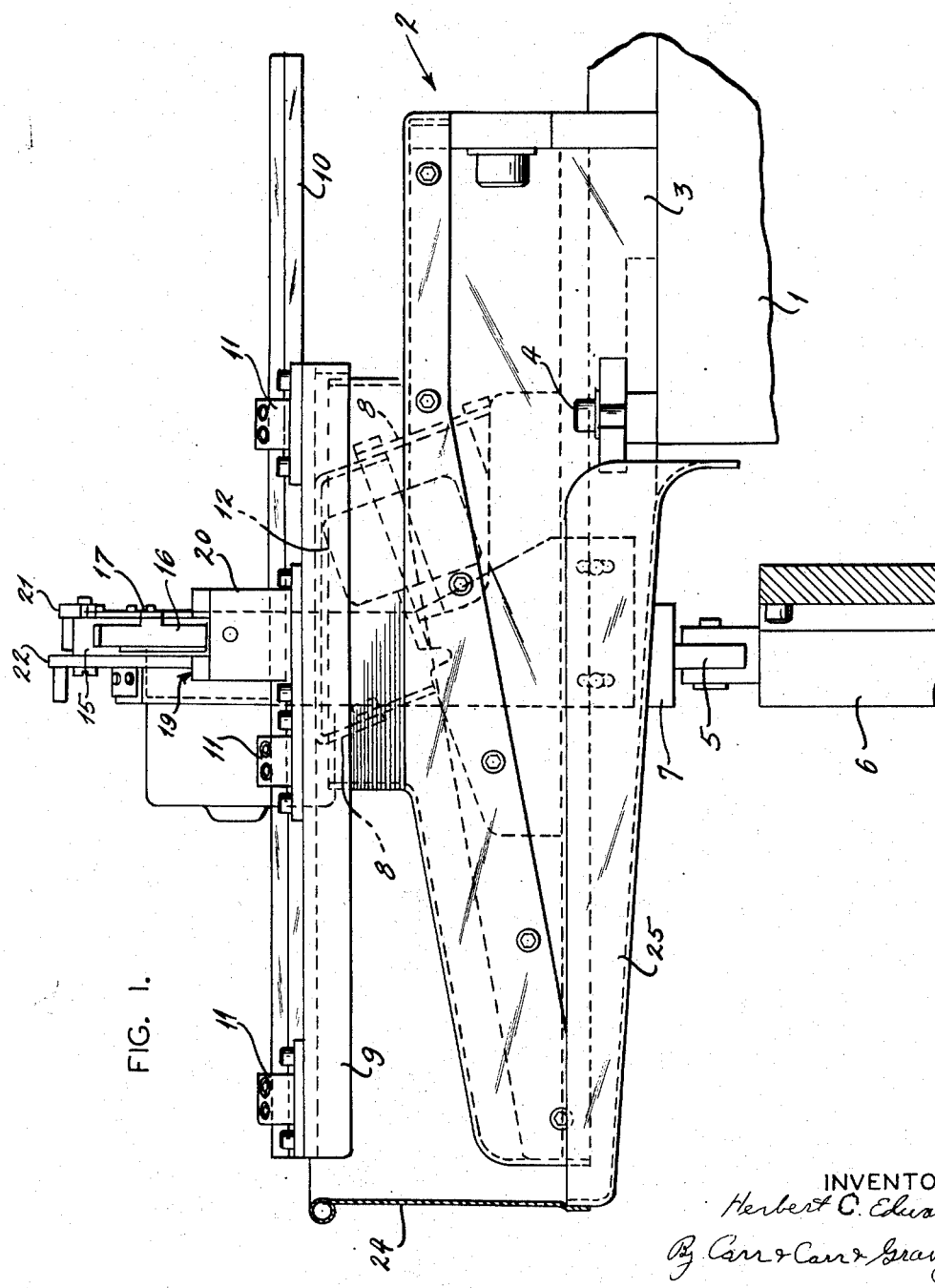
Fig. 1 is a side elevational view of a machine incorporating the invention.

The invention is embodied in the device illustrated in the several views of the drawings in which the numeral 1 designates a portion of the machine frame to which the feeding attachment 2 is secured. The attachment 2 consists of a base member 3 secured to the machine frame by a plurality of screws 4, only two being shown. This machine frame is in reality a portion of the cross-slide for the centerless grinding machine and therefore is movable toward and away from the grinding wheels (not shown). The frame may also be transversely moved for reasons well known in the art. An outboard support for the feeding attachment is provided in the form of a roller 5 secured to supporting brackets 6. The roller 5 engages a leveling plate 7 secured to the base member 3, the leveling plate maintaining the proper alignment of the base member 3 with respect to the machine frame.

A pair of leaf springs 8 are secured to the base 3 and to the feed track base 9, the feed tracks comprising a pair of longitudinally extended rails 10. These rails are chamfered across one corner for resting on the feed track base 9 and are held thereon by suitable clamping means 11. The springs 8 are preferably disposed at an angle to the plane of the base member 3, and one of the leaf springs is actuated by a vibrator 12, this vibrator being an electromagnet operated by a suitable source of electric current (not shown). The vibrator imposes motion on the feed track base 9 so that the work pieces 13 thereon will be moved toward the grinding wheels. The vibrator imposes motion in one direction of the feed track base 9, but the motion in the opposite direction is produced by the action of the springs.

Figure 2:
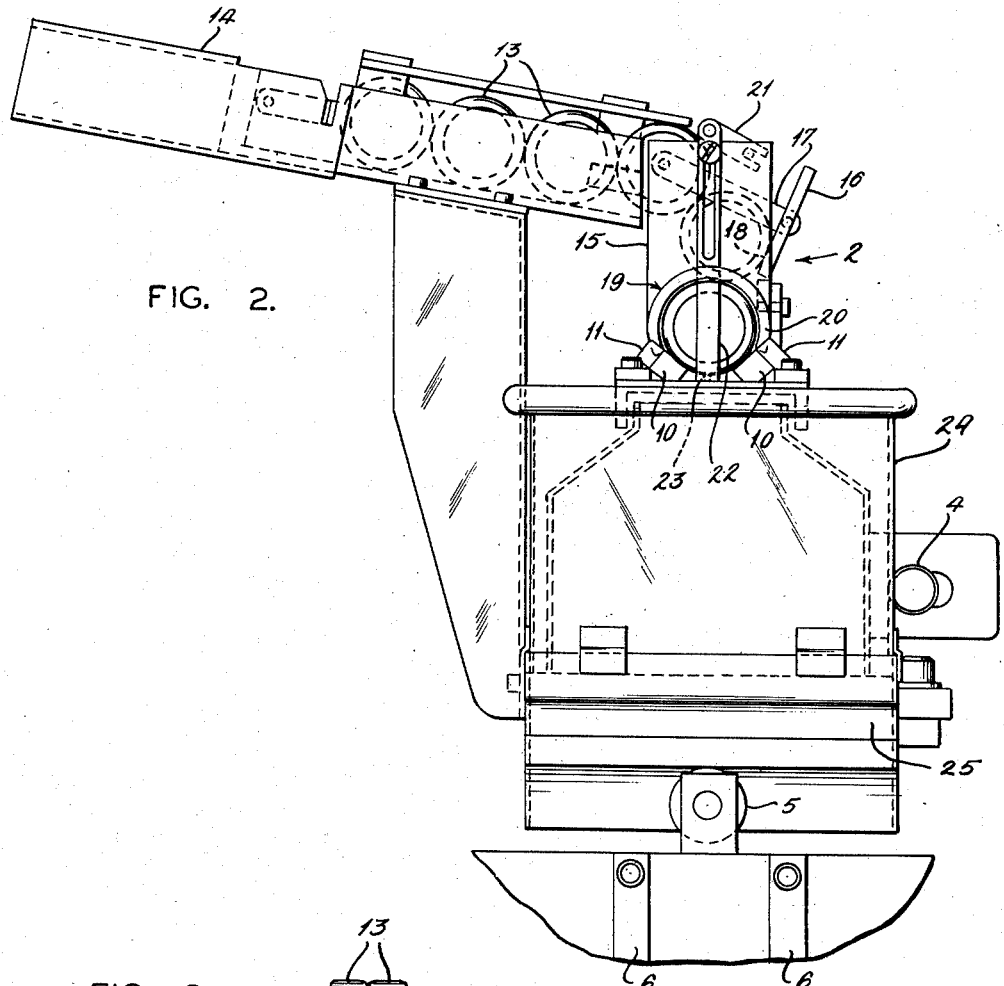
Fig. 2 is an end view thereof.
Figure 3:
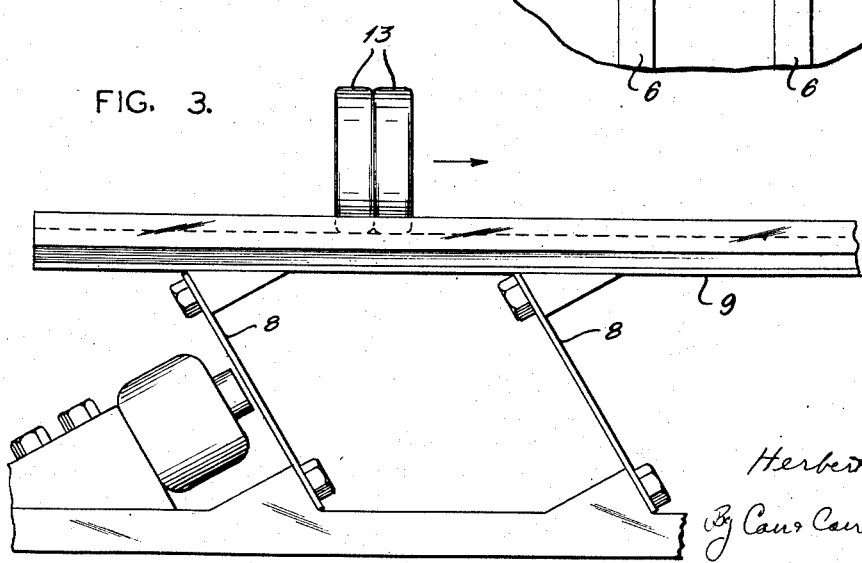
Fig. 3 is a view illustrating the track supporting mechanism.

The work pieces 13, which are illustrated as the cups of antifriction bearings, are received from an inclined chute 14 and fed into a slotted cup feeder 15. The cup feeder has a cup support 16 pivotally mounted therein, adjustment being made by means of a lever 17. The angle made by the cup support with the vertical plane, as viewed in Fig. 2, is such that the cup member in contact therewith will have the major portion of its thrust absorbed by the cup support 16. The cup in the feeder contacts the cup support at 18 and holds the preceding cups in the chute. This point is so chosen that when the preceding cup or the one in the loader is moved, it can easily be replaced by the one in the feeder. The cup in the loader 19 also supports a small portion of the weight of the cup in the feeder as well as those in the chute 14. The work pieces are fed into loader 19 on edge, the loader being made up of a segment of a tubular cylinder 20 that bridges the tracks 10. The cylinder segment has a substantial length so that the cup may be held edgewise therein until firmly aligned with the stack on the tracks and are fed into the centerless grinding machine by the vibrator. The cups are held in the feeder by means of a cup stop 21. A second cup stop 22 is adjustably mounted on the feeder 15 for holding the cups in the loader. This stop holds the cups therein by preventing their bouncing out of the loader as they are dropped onto the tracks 10. The stop 22 is provided with a pin 23 that enables the operator to remove a cup from the loader if such action is necessary. A detachable coolant splash guard 24 surrounds the feed track base 9 and the coolant is drained into a trough 25 for the purpose of permitting it to return to the coolant sump (not shown) in the centerless grinding machine. The vibrator 12 feeds the work pieces 13 along the tracks 10 at a uniform and substantially constant rate, which rate is maintained throughout the entire length of the feed tracks by reason of their support on the supporting brackets 6. The point of contact therewith is critical because the conflicting harmonics tending to create dormant areas along the tracks, are eliminated. Where dormant areas are present, the propelling impulse is weak and the consequent feeding of bearing cups into the machine is faulty and retarded. When present, these dormant areas also separate the cups in the stack moving toward the centerless grinding machine which may cause tipping of the cups with a consequent halting in machine operation. By locating the roller 5 on the leveling plate 7 at the critical point, the undesirable dormant areas in the feed tracks are eliminated. When the cup support 16 is disposed at the proper angle in the cup feeder, the cups will drop onto the feed tracks as fast as the stack is fed into the centerless grinder, thus making possible a continuous and uninterrupted flow of work pieces into the centerless grinding machine.

A feature of the invention in connection with the length of rails between the grinding machine and the loading device and beyond the latter, is the use of a clearing tube (not shown) that is laid on the rails for clearing the grinding machine. The tube is slightly smaller than the finished size of the work piece and long enough to extend over about one-fourth of the rail length plus the width of the grinding wheel. When a batch of cups is being finished and the last cup has dropped to the rails the stop 22 is raised, the clearing tube is then laid on the rails and propelled under the stop against the last cup in the column of cups moving toward the machine. The tube pushes the cups through the grinding machine and finally comes to rest when its engagement with the rails is reduced to a value not producing enough driving force to overcome friction.

What I claim is:

1. A mechanism for feeding cylindrical work pieces in a horizontal stack into a machine tool comprising a chute for receiving a plurality of work pieces in peripheral contact with each other, a feeder including a member for holding work pieces one above the other to which the work pieces are delivered, means in said feeder including a lever contacting a work piece constructed and arranged for supporting a substantial portion of the weight of the work piece in contact therewith and the preceding pieces in the chute, and a loader into which the retained work piece is dropped; and a vibrating track for receiving the dropped work pieces for adding to the stack thereon for delivery to the machine tool.

2. A mechanism for feeding cylindrical work pieces in a horizontal stack into a machine tool comprising a chute having a plurality of work pieces in peripheral contact with each other, a feeder associated with said track and to which work pieces are delivered, adjustably mounted means including a lever in said feeder for supporting the major portion of the weight thereof and a portion of the weight of the work pieces in the chute, a loader for receiving the work pieces from the feeder after the preceding work piece has been fed toward the machine tool; and a vibratory track for receiving work pieces from the loader, the loader placing the work pieces in end-to-end contact with the adjacent work piece in the stack on the track.

3. A mechanism for feeding cylindrical work pieces onto a vibratory track in a horizontal stack for delivery into a machine tool comprising a chute having work pieces therein in peripheral contact with each other, a feeder into which the work pieces are fed, means for holding the work pieces in said feeder, an adjustable lever for supporting a substantial portion of the weight of the work pieces therein and a portion of the weight of the work pieces in said chute; and a loader for receiving work pieces from said feeder for addition to the work pieces in the stack on said track.

4. A mechanism for feeding cylindrical work pieces onto a vibratory track in a horizontal stack for delivery into a machine tool comprising a chute having work pieces therein in peripheral contact with each other, a feeder into which the work pieces are fed, an adjustable lever for supporting a substantial portion of the weight of the work pieces therein and a portion of the weight of the work pieces in said chute, a loader for receiving the work pieces from said feeder for addition to the work pieces in the stack on said track; and means for holding said received work pieces in said loader and causing them to follow the stack movement.

5. A feeding mechanism for a centerless grinding machine comprising a cylindrical work piece receiving track, a pair of springs for supporting said track, an inclined chute for delivering work pieces to said track, means for positioning a work piece on said track including a bridging member therefor, means interposed between said bridging member and said chute for partially supporting said work pieces prior to delivery to said bridging member, said work pieces so delivered to said track also supporting the work pieces in said chute; and means for vibrating said springs and track for moving the work pieces therealong, the work pieces in said interposed means dropping onto said track after said work pieces have been sufficiently moved along said track to permit them to drop thereon.

6. A feeding mechanism for a centerless grinding machine comprising a feed track for receiving cylindrical work pieces having diameters greater than the axial lengths thereof, spring means for supporting said track, an inclined chute for delivering said work pieces, feeder connected to said chute for receiving the work pieces from a chute, an adjustably mounted inclined bar in said feeder for partially supporting said work pieces therein, a bridging member disposed over said track and connected to said feeder for holding said work pieces on edge when resting on said track, the last work piece presented to said track also partially supporting the work pieces in said chute and said feeder; and means for vibrating said spring means and said track for moving the work pieces therealong and permitting the work pieces in the chute to be successively fed onto said track.

7. A feeding mechanism for a centerless grinding machine comprising a feed track for receiving cylindrical work pieces having diameters greater than the axial lengths thereof, springs for supporting said track, an inclined chute for delivering work pieces, a feeder connected to said chute for receiving the work pieces from the chute, an adjustably mounted inclined bar in said feeder for partially supporting said work pieces therein, a bridging member disposed over said track and connected to said feeder for holding said work pieces on edge when resting on said track, the last work piece presented to said track also partially supporting the work pieces in said chute and said feeder, means for holding said work pieces in said bridging member and adapted for lifting them therefrom; and means for vibrating said springs and said track for moving the work pieces therealong and permitting said work pieces in the chute to be successively fed onto said track.

8. A feeding mechanism for a centerless grinding machine comprising a feed track for receiving cylindrical work pieces having diameters greater than the axial lengths thereof, springs for supporting said track, an inclined chute for delivering work pieces, a feeder connected to said chute for receiving the work pieces from the chute, an adjustably mounted inclined bar in said feeder for partially supporting said work pieces therein, a bridging member disposed over said track and connected to said feeder for holding said work pieces on edge when resting on said track, the last work piece presented to said track also partially supporting the work pieces in said chute and said feeder, means for holding said work pieces in said bridging member and adapted for lifting them therefrom, means for confining the work pieces to said feeder after being received from said chute; and means for vibrating said springs and said track for moving the work pieces therealong and permitting the work pieces in the chute to be successively fed onto said track.

HERBERT C. EDWARDS.

References Cited in the file of this patent

UNITED STATES PATENTS

| Number    | Name      | Date          |
|-----------|-----------|---------------|
| 2,260,843 | Strong    | Oct. 28, 1941 |
| 2,462,235 | Swenton   | Feb. 22, 1949 |
| 2,472,707 | Jones et al. | June 7, 1949 |